(12) United States Patent
Kumarasamy et al.

(10) Patent No.: US 11,500,751 B2
(45) Date of Patent: Nov. 15, 2022

(54) LOG MONITORING

(71) Applicant: Commvault Systems, Inc., Tinton Falls, NJ (US)

(72) Inventors: Paramasivam Kumarasamy, Morganville, NJ (US); Amey Vijaykumar Karandikar, Long Branch, NJ (US); Durga Prasad Chedalavada, Andhra Pradesh (IN); Suma Seshadri, Karnataka (IN); Anand Vibhor, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 290 days.

(21) Appl. No.: 16/808,083

(22) Filed: Mar. 3, 2020

(65) Prior Publication Data

US 2020/0272549 A1 Aug. 27, 2020

Related U.S. Application Data

(63) Continuation of application No. 16/684,349, filed on Nov. 14, 2019, now abandoned, which is a (Continued)

(51) Int. Cl.
*G06F 11/00* (2006.01)
*G06F 11/30* (2006.01)
(Continued)

(52) U.S. Cl.
CPC ...... *G06F 11/3006* (2013.01); *G06F 11/1461* (2013.01); *G06F 11/3072* (2013.01);
(Continued)

(58) Field of Classification Search
CPC ............. G06F 11/3006; G06F 11/1458; G06F 11/1461; G06F 11/3072; G06F 11/3089; G06F 11/2476
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.
(Continued)

*Primary Examiner* — Loan L. T. Truong
(74) *Attorney, Agent, or Firm* — Knobbe, Martens, Olson & Bear, LLP

(57) ABSTRACT

A log monitoring system uses log monitoring rules to monitor log data generated by applications executing on a client computing device. By monitoring log data, the system detects that one or more triggering events have occurred on the client computing device. In response, the log monitoring system can perform one or more appropriate remedial actions. Additionally, in response to the detected event(s), the log monitoring system can extract a select subset of relevant data from the client and transmit the subset of data to a separate repository for storage and/or processing.

18 Claims, 9 Drawing Sheets

Related U.S. Application Data continuation of application No. 16/179,335, filed on Nov. 2, 2018, now abandoned, which is a continuation of application No. 13/774,462, filed on Feb. 22, 2013, now abandoned.

(60) Provisional application No. 61/603,017, filed on Feb. 24, 2012.

(51) Int. Cl.
  *G06F 11/34* (2006.01)
  *G06F 11/14* (2006.01)

(52) U.S. Cl.
  CPC ...... *G06F 11/3089* (2013.01); *G06F 11/3476* (2013.01); *G06F 11/1458* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,827,400 A | 5/1989 | Dunwell et al. |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,329,465 A | 7/1994 | Arcella et al. |
| 5,347,653 A | 9/1994 | Flynn et al. |
| 5,410,295 A | 4/1995 | Van Lint |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,734,817 A | 3/1998 | Roffe et al. |
| 5,781,703 A | 7/1998 | Desai et al. |
| 5,960,170 A * | 9/1999 | Chen ................ H04L 63/145 714/38.14 |
| 6,073,172 A | 6/2000 | Frailong et al. |
| 6,418,478 B1 | 7/2002 | Ignatius et al. |
| 6,542,972 B2 | 4/2003 | Oshinsky et al. |
| 6,658,436 B2 | 12/2003 | Oshinsky et al. |
| 6,721,767 B2 | 4/2004 | Meno et al. |
| 6,760,723 B2 | 7/2004 | Oshinsky et al. |
| 6,795,856 B1 | 9/2004 | Bunch |
| 6,959,368 B1 | 10/2005 | St. Pierre et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,107,416 B2 | 9/2006 | Stuart et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,213,176 B2 | 5/2007 | Banko |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,502,972 B1 | 3/2009 | Chilukuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,779,021 B1 | 8/2010 | Smith et al. |
| 7,801,864 B2 | 9/2010 | Prahlad et al. |
| 7,809,914 B2 | 10/2010 | Kottomtharayil et al. |
| 7,895,167 B2 | 2/2011 | Berg et al. |
| 7,975,262 B2 | 7/2011 | Cozmei |
| 8,077,341 B2 | 12/2011 | Hull et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,266,159 B2 | 9/2012 | Torres |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,396,838 B2 | 3/2013 | Brockway et al. |
| 8,407,673 B2 | 3/2013 | Terpolilli |
| 8,495,060 B1 | 7/2013 | Chang |
| 8,578,120 B2 | 11/2013 | Attarde et al. |
| 8,601,323 B2 | 12/2013 | Tsantilis |
| 8,874,967 B2 | 10/2014 | Spafford et al. |
| 8,904,243 B2 | 12/2014 | Loimuneva et al. |
| 8,954,446 B2 | 2/2015 | Vijayan Retnamma et al. |
| 8,959,299 B2 | 2/2015 | Ngo et al. |
| 9,020,900 B2 | 4/2015 | Vijayan Retnamma et al. |
| 9,098,495 B2 | 8/2015 | Gokhale |
| 9,104,871 B2 * | 8/2015 | Tuvell ................ G06F 16/245 |
| 9,158,469 B2 | 10/2015 | Winter |
| 9,239,687 B2 | 1/2016 | Vijayan et al. |
| 9,244,779 B2 | 1/2016 | Littlefield et al. |
| 9,391,825 B1 | 7/2016 | Beal et al. |
| 9,424,271 B2 | 8/2016 | Tata |
| 9,633,033 B2 | 4/2017 | Vijayan et al. |
| 9,639,274 B2 | 5/2017 | Maranna et al. |
| 9,934,265 B2 | 4/2018 | Karandikar et al. |
| 10,007,795 B1 | 6/2018 | Chung et al. |
| 10,009,360 B1 | 6/2018 | Todd et al. |
| 10,210,330 B1 | 2/2019 | Chen |
| 10,296,613 B2 | 5/2019 | Karandikar et al. |
| 10,331,885 B2 | 6/2019 | Chelarescu et al. |
| 10,366,096 B2 | 7/2019 | Ferrar |
| 10,545,699 B2 | 1/2020 | Baptist et al. |
| 11,100,064 B2 | 8/2021 | Dwarampudi et al. |
| 2002/0186131 A1 | 12/2002 | Fettis |
| 2004/0187029 A1 | 9/2004 | Ting |
| 2005/0138642 A1 | 6/2005 | Breh et al. |
| 2005/0192921 A1 | 9/2005 | Chaudhuri et al. |
| 2006/0031942 A1 | 2/2006 | Jones et al. |
| 2006/0036989 A1 | 2/2006 | Chaudhuri et al. |
| 2006/0075306 A1 | 4/2006 | Chandrasekaran |
| 2006/0224846 A1 | 10/2006 | Amarendran et al. |
| 2007/0220602 A1 | 9/2007 | Ricks et al. |
| 2007/0283438 A1 * | 12/2007 | Fries ................ G06F 11/1448 726/24 |
| 2008/0022209 A1 | 1/2008 | Lyle |
| 2008/0183773 A1 * | 7/2008 | Choy ................ G06F 11/1451 |
| 2008/0183805 A1 | 7/2008 | Cancel et al. |
| 2008/0243882 A1 | 10/2008 | Bailey et al. |

(56) References Cited

U.S. PATENT DOCUMENTS

| | | | |
|---|---|---|---|
| 2008/0244748 A1* | 10/2008 | Neystadt | H04L 63/308 726/25 |
| 2008/0288215 A1 | 11/2008 | Duberry | |
| 2009/0038010 A1 | 2/2009 | Ma et al. | |
| 2009/0254655 A1 | 10/2009 | Kidwell et al. | |
| 2009/0276205 A1 | 11/2009 | Jennings et al. | |
| 2009/0300761 A1* | 12/2009 | Park | G06F 21/562 707/999.102 |
| 2009/0319534 A1 | 12/2009 | Gokhale | |
| 2009/0328119 A1 | 12/2009 | Kan et al. | |
| 2009/0328186 A1 | 12/2009 | Pollutro et al. | |
| 2010/0123575 A1 | 5/2010 | Mittal et al. | |
| 2010/0125554 A1 | 5/2010 | Jennings et al. | |
| 2010/0169472 A1 | 7/2010 | Okamoto et al. | |
| 2010/0185632 A1 | 7/2010 | Ylonen | |
| 2010/0280999 A1* | 11/2010 | Atluri | G06F 11/1471 707/657 |
| 2011/0083176 A1* | 4/2011 | Martynenko | G06F 21/55 726/13 |
| 2011/0093461 A1 | 4/2011 | Mui et al. | |
| 2012/0011153 A1 | 1/2012 | Buchanan et al. | |
| 2012/0016839 A1 | 1/2012 | Yueh | |
| 2012/0113265 A1 | 5/2012 | Galvin | |
| 2012/0150818 A1 | 6/2012 | Vijayan Retnamma et al. | |
| 2012/0150826 A1 | 6/2012 | Vijayan Retnamma et al. | |
| 2012/0173567 A1 | 7/2012 | Zavatone et al. | |
| 2012/0179809 A1 | 7/2012 | Barsness et al. | |
| 2012/0203895 A1 | 8/2012 | Jaudon et al. | |
| 2012/0278354 A1 | 11/2012 | Yan et al. | |
| 2013/0054635 A1 | 2/2013 | Phelps et al. | |
| 2013/0080538 A1 | 3/2013 | McEachern et al. | |
| 2013/0082848 A1 | 4/2013 | Marjanen et al. | |
| 2013/0227352 A1 | 8/2013 | Kumarasamy et al. | |
| 2013/0317944 A1 | 11/2013 | Huang et al. | |
| 2013/0332685 A1 | 12/2013 | Kripalani et al. | |
| 2013/0335785 A1 | 12/2013 | Qi et al. | |
| 2014/0025796 A1 | 1/2014 | Vibhor et al. | |
| 2014/0074793 A1 | 3/2014 | Doering et al. | |
| 2014/0201170 A1 | 7/2014 | Vijayan et al. | |
| 2014/0201485 A1 | 7/2014 | Ahn et al. | |
| 2014/0270159 A1 | 9/2014 | Youn et al. | |
| 2014/0298112 A1 | 10/2014 | Otsuka et al. | |
| 2015/0172120 A1 | 6/2015 | Dwarampudi et al. | |
| 2015/0213484 A1 | 7/2015 | Amara | |
| 2015/0236896 A1 | 8/2015 | Brown et al. | |
| 2015/0242483 A1 | 8/2015 | Zhou et al. | |
| 2015/0347753 A1* | 12/2015 | Tuvell | G06F 21/563 726/24 |
| 2016/0078245 A1 | 3/2016 | Amarendran et al. | |
| 2016/0292263 A1 | 10/2016 | Ferrar | |
| 2016/0350391 A1 | 12/2016 | Vijayan et al. | |
| 2017/0155674 A1 | 6/2017 | Seo et al. | |
| 2017/0168903 A1 | 6/2017 | Dornemann et al. | |
| 2017/0185488 A1 | 6/2017 | Kumarasamy et al. | |
| 2017/0192866 A1 | 7/2017 | Vijayan et al. | |
| 2017/0193003 A1 | 7/2017 | Vijayan et al. | |
| 2017/0223031 A1 | 8/2017 | Gu et al. | |
| 2017/0235647 A1 | 8/2017 | Kilaru et al. | |
| 2017/0242871 A1 | 8/2017 | Kilaru et al. | |
| 2017/0269955 A1 | 9/2017 | Hardy | |
| 2017/0277774 A1 | 9/2017 | Eigner et al. | |
| 2017/0279720 A1 | 9/2017 | Patnaik et al. | |
| 2017/0279832 A1 | 9/2017 | Di Pietro et al. | |
| 2017/0364681 A1 | 12/2017 | Roguine et al. | |
| 2018/0007069 A1 | 1/2018 | Hunt et al. | |
| 2018/0018458 A1 | 1/2018 | Schmugar et al. | |
| 2018/0204000 A1 | 7/2018 | Charters et al. | |
| 2018/0253358 A1 | 9/2018 | Gu | |
| 2019/0075130 A1 | 3/2019 | Petry et al. | |
| 2019/0095304 A1 | 3/2019 | Kumarasamy et al. | |
| 2019/0108340 A1 | 4/2019 | Bedhapudi et al. | |
| 2019/0108341 A1 | 4/2019 | Bedhapudi et al. | |
| 2019/0109870 A1 | 4/2019 | Bedhapudi et al. | |
| 2019/0205317 A1 | 7/2019 | Tobias et al. | |
| 2020/0320215 A1 | 10/2020 | Bhosale et al. | |
| 2021/0271758 A1 | 9/2021 | Bedhapudi et al. | |
| 2022/0043791 A1 | 2/2022 | Dwarampudi et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 9513580 | 5/1995 |
| WO | WO 9912098 | 3/1999 |
| WO | WO 2006/052872 | 11/2005 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Nagappan et al., Abstracting Log Lines to Log Event Types for Mining Software System Logs, Working Conference on Mining Software Repositories (MSR), May 2010, 7th IEEE, 6 pages.

Rosenblum et al., "The Design and Implementation of a Log-Structure File System," Operating Systems Review SIGOPS, vol. 25, No. 5, May 1991, New York, US, pp. 1-15.

* cited by examiner

LOG MONITORING

INCORPORATION BY REFERENCE TO ANY PRIORITY APPLICATIONS

Any and all applications for which a foreign or domestic priority claim is identified in the Application Data Sheet, or any correction thereto, are hereby incorporated by reference into this application under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

Computers have become an integral part of business operations such that many banks, insurance companies, brokerage firms, financial service providers, and a variety of other businesses rely on computer networks to store, manipulate, and display information that is constantly subject to change. The data stored by these businesses can be valuable and it is important that the data be accurate and robust. Accordingly, businesses seek reliable, cost-effective ways to store, protect and access the information stored on their computer networks.

Computers often record events to provide an audit trail that can be used to understand the activity of the system and to diagnose problems. These events can be recorded in "log files," and often times various applications and/or databases used by businesses will create log files. The log files can be created for each application and can contain a variety of appropriate information, including information regarding what user accessed what files and folders, what, if any, changes were made to the accessed files, application errors (e.g., relational database errors), permissions, as well as additional information regarding the access of files contained within the applications or databases.

Log files can become extremely large and contain enormous amounts of information. It can therefore be difficult to effectively manage and utilize log information. For instance, reviewing log files to audit system behavior can become resource intensive and time consuming.

SUMMARY

A system and method is provided to monitor log data in a data storage environment. The system includes a data store that includes a first set of log monitoring rules received from a storage manager module and log data generated by at least one application executing on a client computing device. The first set of log monitoring rules define one or more triggering events associated with a client computing device in communication with the storage manager module. The log data includes information related to events that occur on the client computing device. The system also includes a log monitoring module executing in one or more processors and configured to monitor the log data; based on the log monitoring rules, detect whether a triggering event has occurred on the client computing device; and upon detecting that a triggering event has occurred on the client computing device, and based on the log monitoring rules, filter data on the client computing device to extract a select subset of data for transmission to a collection repository that is separate from the client computing device and stores the select subset.

DETAILED DESCRIPTION

Log Monitoring Overview

Figure 1A:
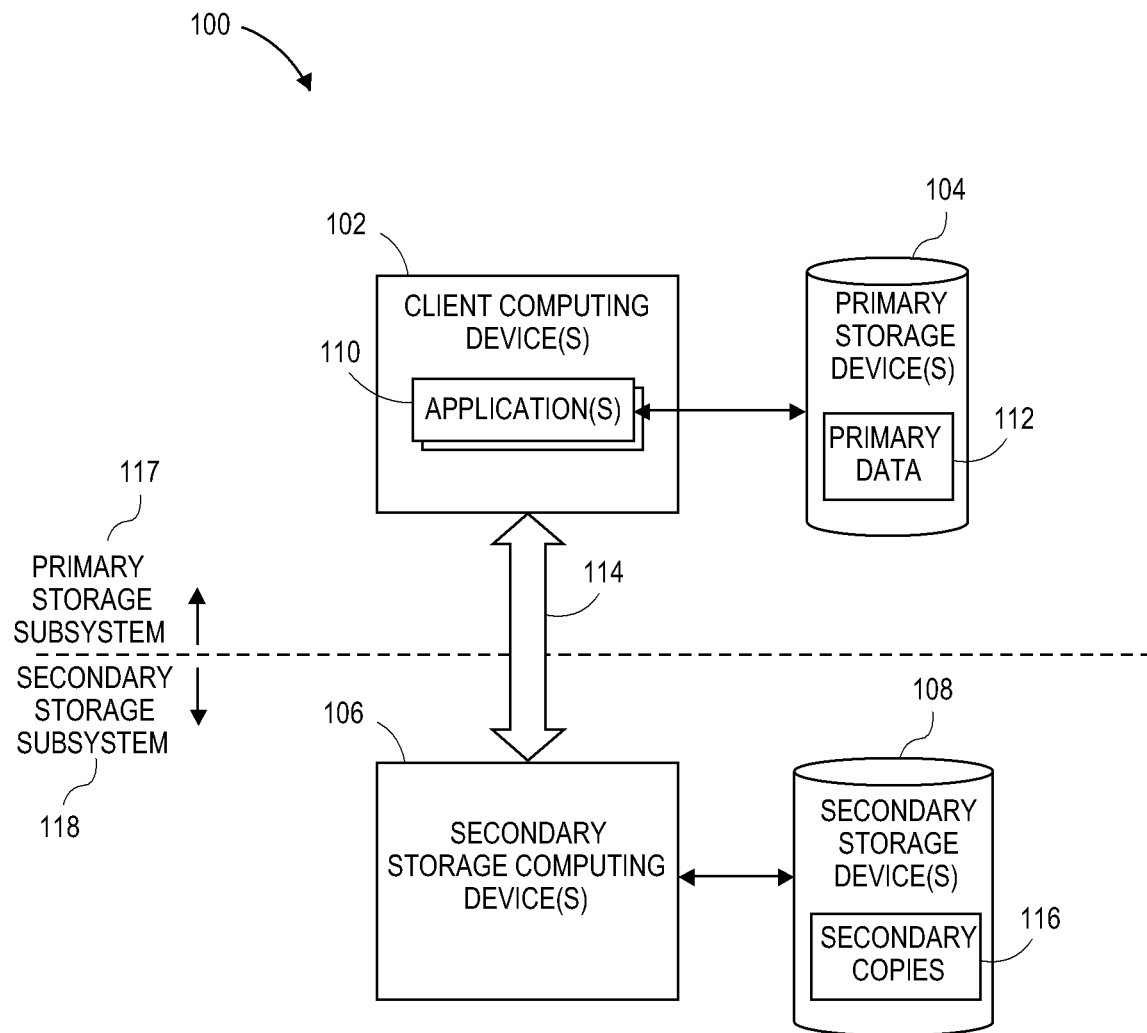
FIG. 1A is a block diagram illustrating an exemplary information management system.

The present disclosure is directed to a system, method, and computer readable non-transitory storage medium for monitoring and processing log data generated by one or more client computers generating production data. According to aspects of the disclosure, for example, client computers receive a set of log monitoring rules that can be broadcast to each of the clients from a centralized entity, such as a storage manager in a networked storage environment.

Each client can run a log monitor which monitors log data (also referred to as logs) of applications executing on the client or elsewhere based on the log monitoring rules. During the monitoring process, the log monitor can further detect and respond to certain triggering events, as defined by the log monitoring rules.

The detected events can include any number of different types of events, such as an unauthorized file access or attempted access, an unauthorized deletion, or modification of a folder or file or attempt to do the same, access by a terminated user, error conditions, virus detection, etc.

In certain embodiments, the response to the detected event can include, but is not limited to, notifying the storage manager or other appropriate entity of the detected event. In some embodiments, the response can include extracting and/or transmitting select log data (e.g., log data associated with the detected event) for storage and/or processing based on the log monitoring rules. For example, the log monitor can extract select log and/or other client data and transmit the select data to a separate component (referred to herein as a "collection agent" or "collection repository"). Thus, the collection agent can store a limited, relevant subset of client data and not the entire universe of log data in the system. As a result, the collection agent data can be processed relatively efficiently in order to audit system behavior, diagnose problems, and identify appropriate remedial actions. The collection agent can be implemented on or as separate computing devices, with their own storage and processing capability. Thus, usage of the resources of the client machines in the review and collection of monitored data is minimized, improving system performance. In this fashion, the collection agent allows substantially "off-line" auditing of system behavior, reducing the impact on the clients. Moreover, collection agent can be associated with (e.g., local to) a particular client or group of clients, reducing network traffic associated with log monitoring process.

As an example, and not to be construed as limiting, a log monitoring system includes a storage manager, at least one client, at least one collection agent, one or more media agents, and one or more storage devices. The storage manager has access to various log monitoring rules that can be provided by an administrator, another user, or some other entity in the log monitoring system. The storage manager forwards the rules to at least one log monitor running on the client. Based on the log monitoring rules, the log monitor monitors log data and/or other data generated by applications running on the client.

For purposes of this example, the log monitoring rules indicate that in the event of an unauthorized access by a user (User1) to a first database (DB1) associated with the client (Client1), the log monitor notifies the storage manager of the unauthorized access, transmits a select subset of data related to the unauthorized access to the collection agent, and disables or otherwise limits the access to DB1. The log monitoring rules can further specify that in addition to the information regarding the unauthorized access, all log data related to the particular unauthorized user (e.g., data related to previous activities of the user on the particular client) should be transmitted to the collection agent. The log monitor can monitor in real time, or can periodically review the logs stored in the data store.

Upon detecting an unauthorized access by User1 of DB1, the log monitor transmits the log data related to the access of DB1 by User1, such as date information, username and password information, etc., to the collection agent according to the log monitoring rules. The log monitor is described as transmitting the log data; however, any number of different components within the client can transmit the log data, depending on the embodiment. Based on the log monitoring rules, the log monitor can also transmit to the collection agent information related to all accesses by User1 of any application on Client1. Furthermore, the log monitor provides a notification to the storage manager that the log event occurred and disables or otherwise limits access to the DB1, based on the log monitoring rules.

Thus, by monitoring log data on Client1, the log monitor detects the occurrence of a triggering event on Client1 and responds in accordance with the log monitoring rules to appropriately address the situation. In addition, the collection agent stores a filtered, relevant subset of data from Client1 as specified by the log monitoring rules. The filtered subset of data in the collection agent can be processed relatively quickly to efficiently audit system activities and to identify and perform appropriate remedial actions. Or the log data stored on the collection agent can be backed up, archived, or otherwise copied for later retrieval without having to back up the entire universe of log data in the system, saving resources.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. Pub. No. 2012/0084269, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA";

and

U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
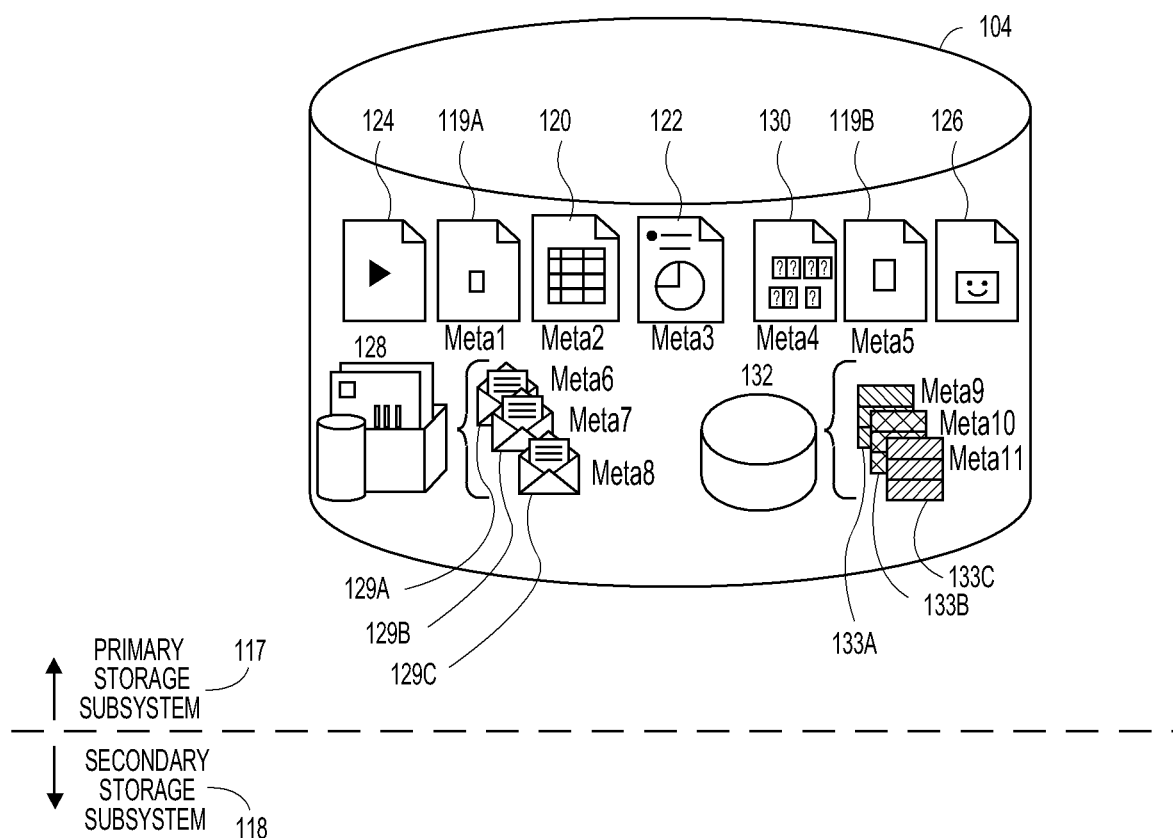
FIG. 1B is a detailed view of a primary storage device, a secondary storage device, and some examples of primary data and secondary copy data.
Figure 1B:
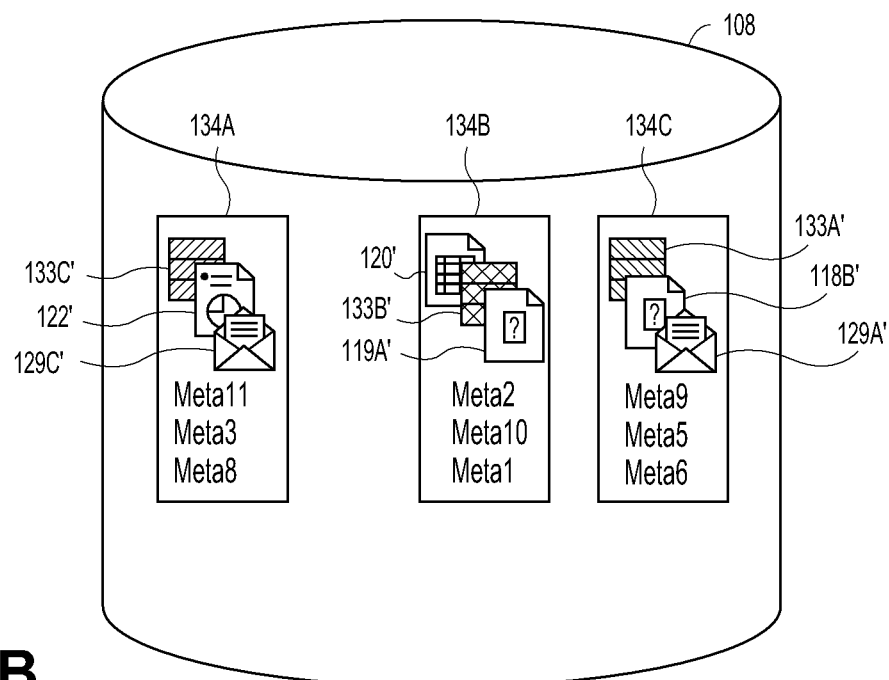

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
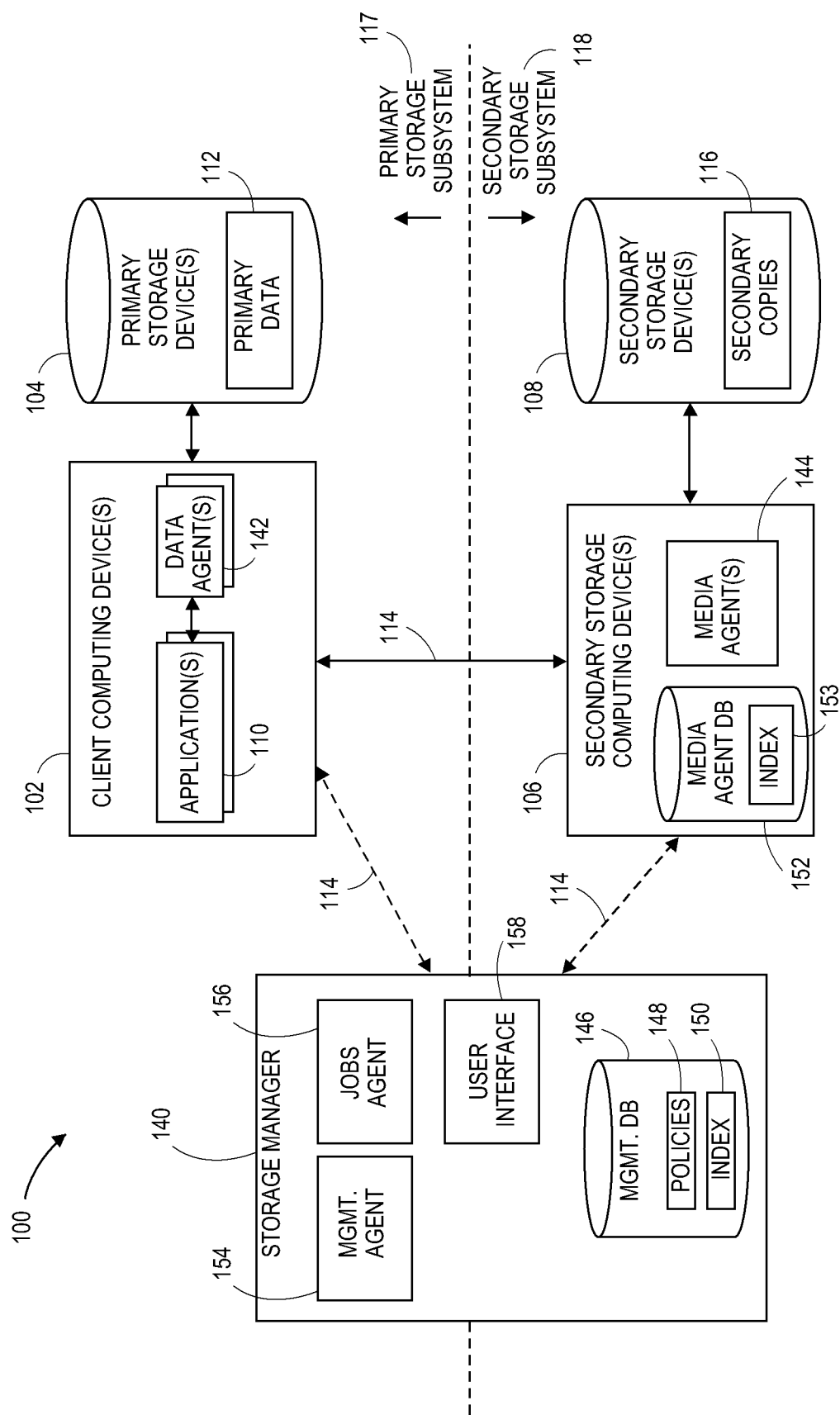
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
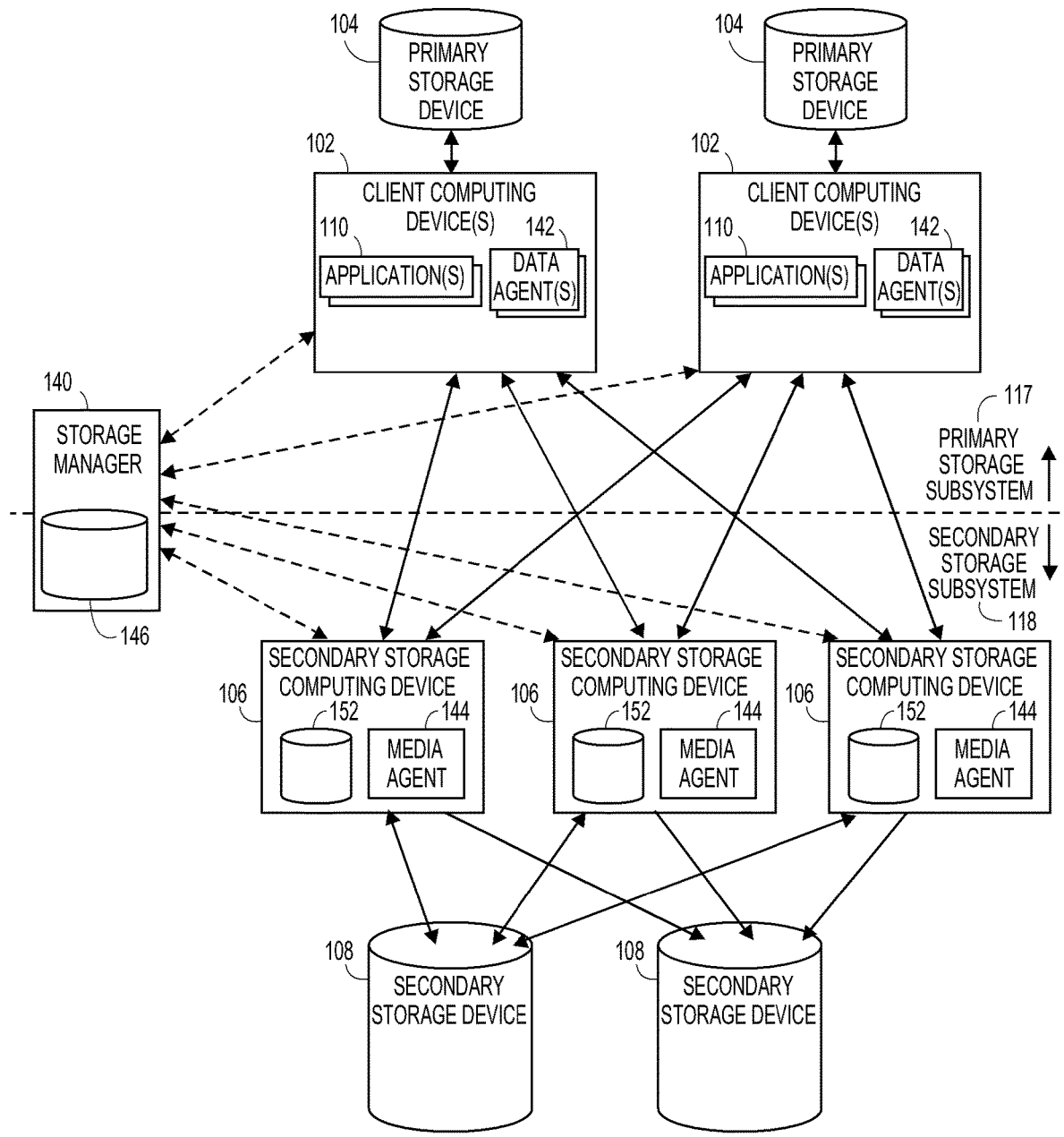
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups.

Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having predefined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
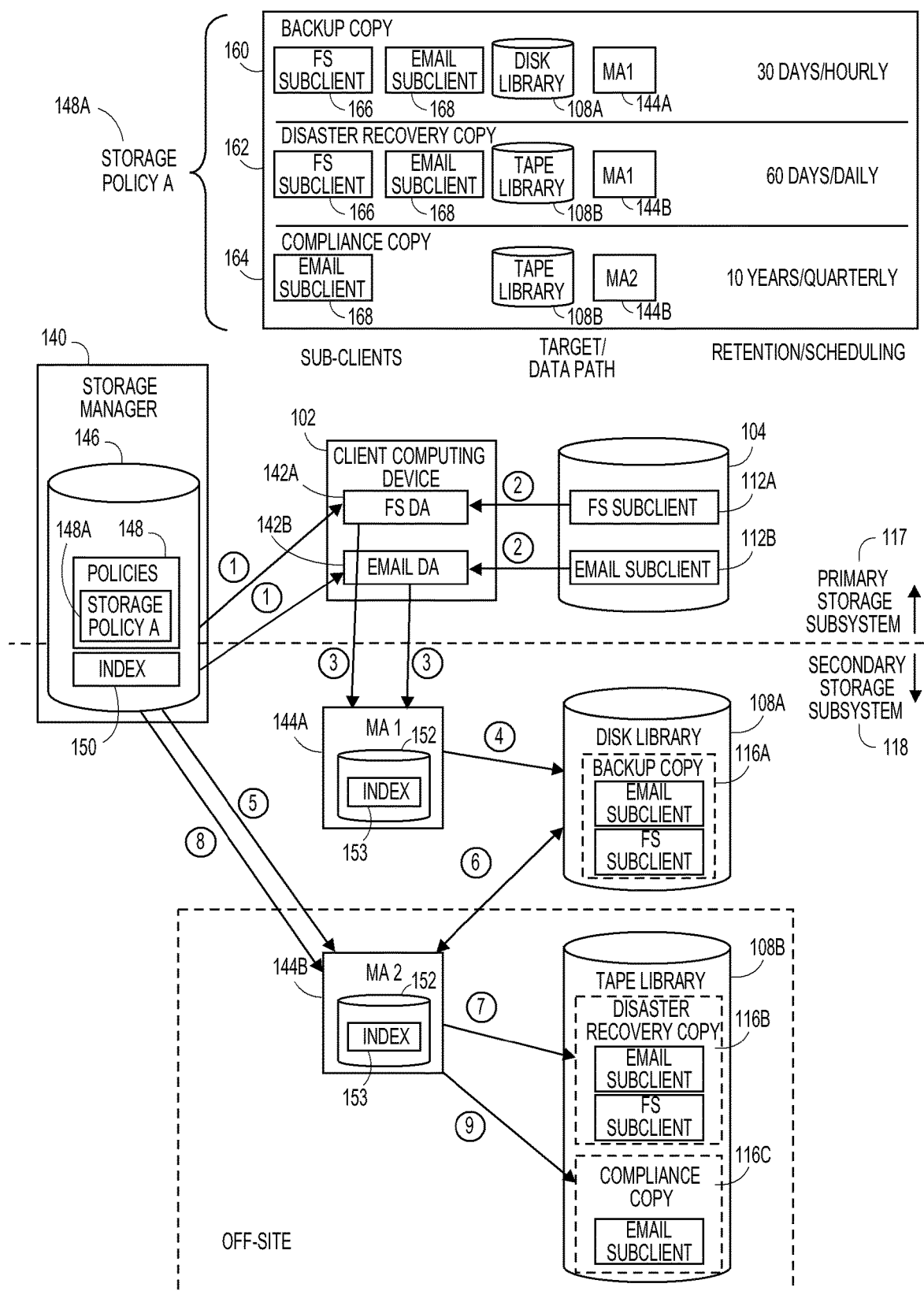
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 1128, include data generated by an e-mail client application operating on the client computing device 102, and can include mailbox information, folder information, emails, attachments, associated database information, and the like. As described above, the sub-clients can be logical containers, and the data included in the corresponding primary data 112A, 1128 may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 1168 according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 1168 on the tape library 1088. In some cases, the disaster recovery copy 1168 is a direct, mirror copy of the backup copy 116A, and remains in the backup format. In other embodiments, the disaster recovery copy 116C may be generated in some other manner, such as by using the primary data 112A, 1128 from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 1088 at step 9, as specified in the compliance copy rule set 164. In the example, the compliance copy 116C is generated using the disaster recovery copy 1168. In other embodiments, the compliance copy 116C is instead generated using either the primary data 1128 corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 1168, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Example Log Monitoring Systems

Figure 2:
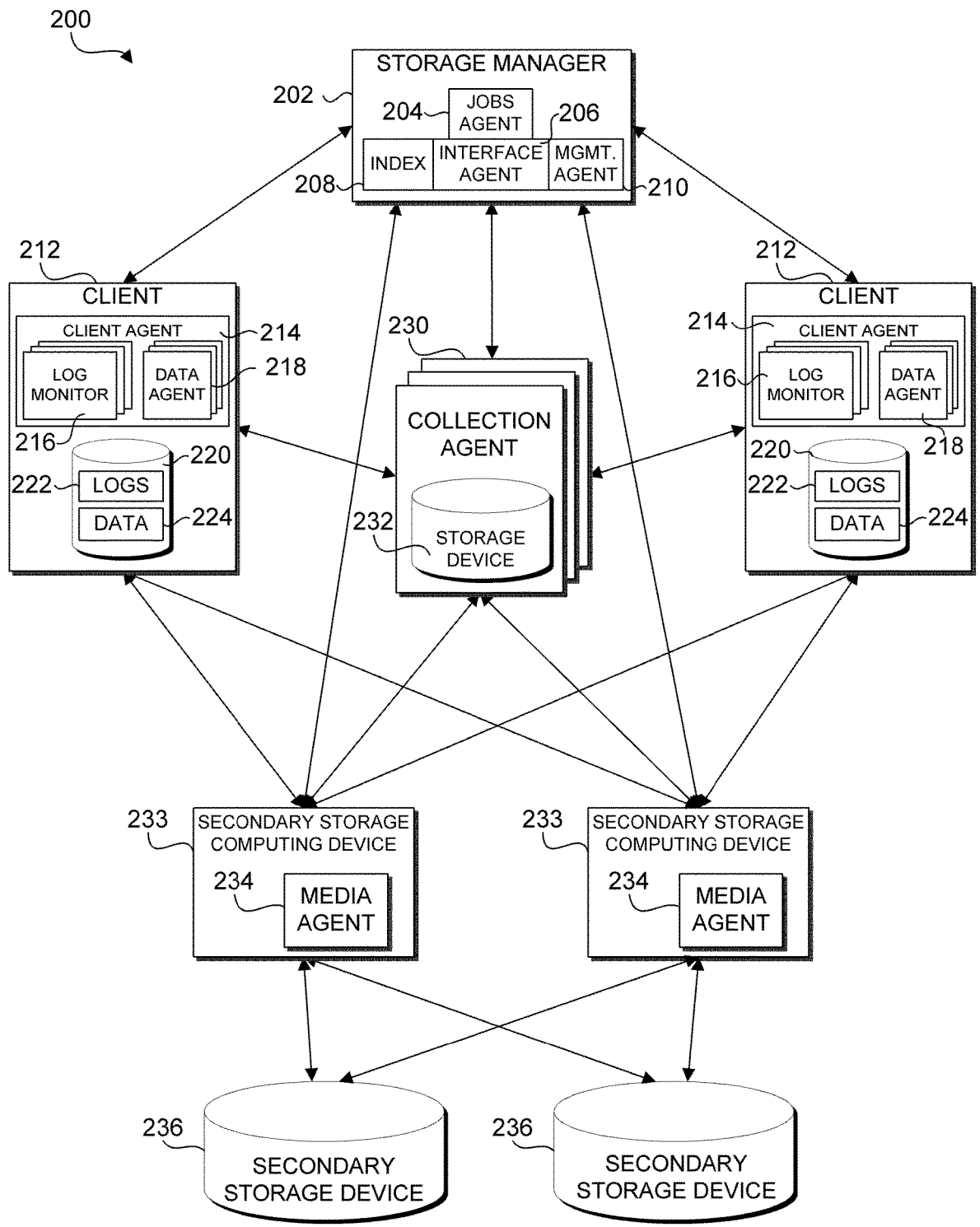
FIG. 2 is a block diagram illustrating an embodiment of a log monitoring system in accordance with the principles of the present disclosure.

FIG. 2 illustrates one arrangement of resources in a log monitoring system in accordance with the principles of the present disclosure. The log monitoring system 200 can include any combination of the components described above with reference to FIGS. 1A-1E. For example, as shown, the log monitoring system 200 can include a storage manager 202 (including jobs agent 204, interface agent 206, index 208, and management agent 210), one or more client computing devices 212, secondary storage computing devices 233, media agents 234, and/or secondary storage devices 236. In addition to the components described above with reference to FIGS. 1A-1E, the log monitoring system can include one or more client agents 214, one or more log monitors 116, and one or more collection agents 230.

In addition to the data agents 218 and primary storage devices 220 described previously, each client computing device 212 can include one or more client agents 214 and one or more log monitors 216. The client agent 214 can be a software module or part of a software module that includes at least one data agent 218 and at least one log monitor 216. As described previously, the data agent 218 is generally responsible for implementing storage-related operations related to data 224 stored in the primary storage device 220. As will be described in further detail, the log monitor 216 is generally responsible for monitoring log data 222, which may be organized as one or more log files stored in the primary storage device 220.

As described previously, each primary storage device 220 can be a local storage device or can be remotely located and communicate with the client over a network, such as a LAN, WAN, etc. Further, the primary storage device 220 can include log files 222 and other data 224 accessible by the client computing device 212, such as applications, files, programs, etc. The log files 222 generally record events and can provide an audit trail that can be used to understand the activity of the system and to diagnose problems. Each user of the client computing device 212 and/or each application executed by the client computing device 212 can be associated with its own log file 222, or, in other embodiments, multiple users and/or applications can share log files. The log files 222 can be stored in the primary storage device 220, or in some other appropriate location. The applications that generate log data can include, but are not limited to relational database applications (e.g., MySQL, IBM DB2, Oracle, etc.), Lotus Notes, operating system logs (e.g., Windows, Linux or Unix logs), SSH, FTP, remote desktop, Microsoft Exchange, etc.

The log files 222 can include a variety of information, including, without limitation, information regarding files and folders that a user attempted to and/or did access or modify, time and date information associated with access attempts, edits, or other relevant activities, whether access or modification attempts succeeded or failed, a number of successful and/or failed requests, password information, security and/or restriction settings for the files accessed, errors encountered, log-ins or attempted log-ins by unauthorized users, etc. Unauthorized users can include known users who do not have permission to perform the action in question, or unidentified users, such as users associated with an unknown IP address, an unknown username, or an unknown user identification. For example, each time a particular user uses a client computing device 212 to access an SQL database, a log including an identification of the user, the date and time of the access, and identifying the files that were modified can be stored in a log file 222.

The log monitor 216 can be a software module or part of a software module configured to implement one or more log monitoring rules as received from the storage manager 202. The rules may alternatively be received from some other centralized entity common to one or more of the client computing devices 212, or may be generated local to the respective client computing devices 212.

The collection agents 232 (also referred to herein as collection repositories) can include one or more storage devices 232, and are generally used to store a filtered subset of log data and/or other data from the client systems 212. Each collection agent 230 may be associated with a corresponding client computing device 212 or group of client computing devices 212, for example. Collection agents can advantageously provide a repository for off-line processing of a manageable, relevant subset of client data, and will be described in further detail below.

Figure 3A:
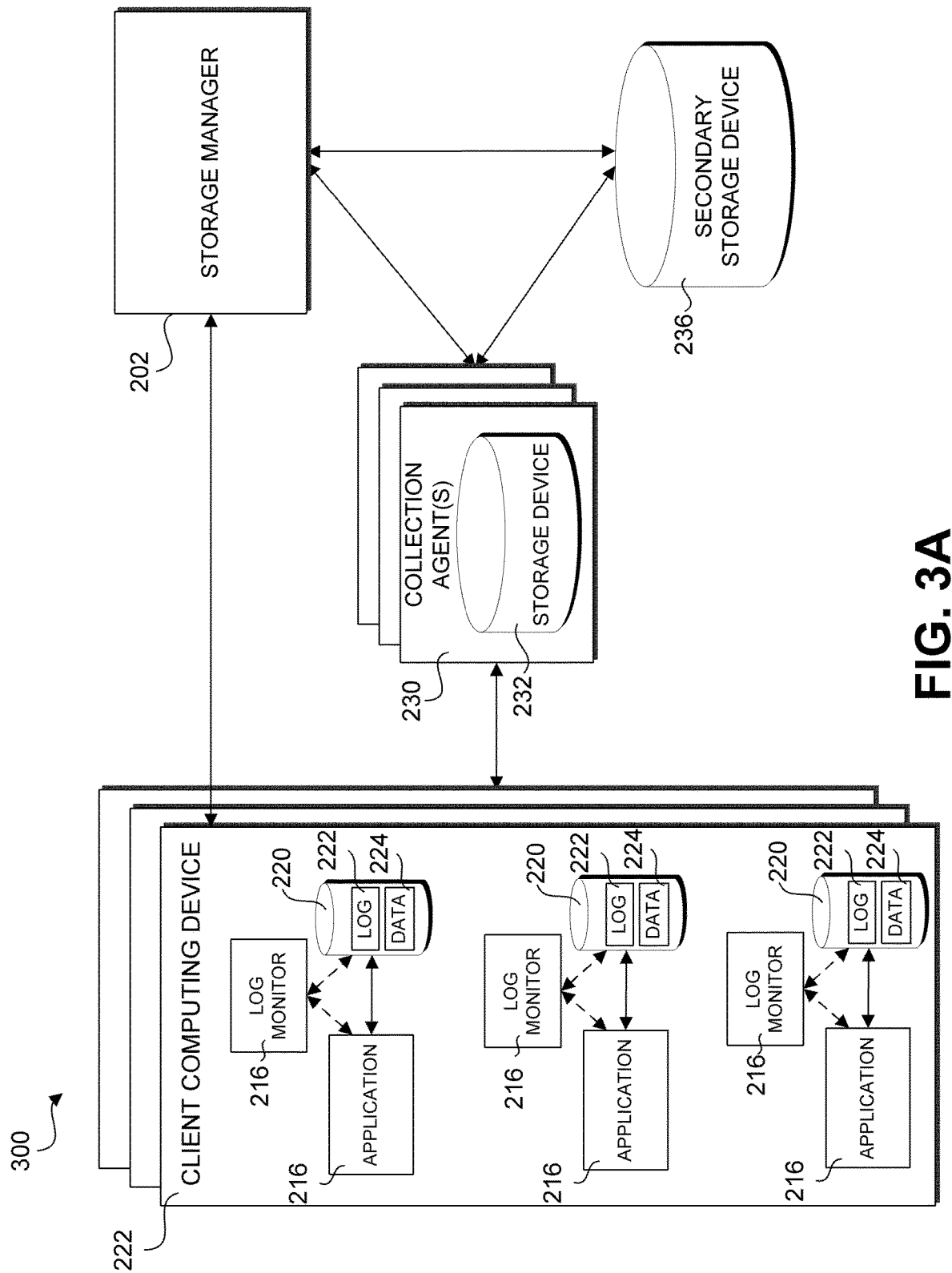
FIG. 3A is a block diagram of another embodiment of a log monitoring system.

FIG. 3A is a block diagram of an embodiment of a log monitoring system 300. Similar to the system 200 of FIG. 2, the log monitoring system 300 illustrated in FIG. 3A includes a storage manager 202, a client computing device 212, a collection agent 230, and a secondary storage device 236. Although not illustrated for simplicity, the log monitoring system 300 can include media agents 234 and/or other components included in the system 200 of FIG. 2 and/or system 100 of FIGS. 1A-1E that are not depicted in FIG. 3A. As illustrated, a single client computing device 212 can include multiple log monitors 216, multiple applications 226, and multiple primary storage devices 220. Although illustrated as multiple storage devices, the primary storage devices 220 can form a single primary storage device 220 in other embodiments. In addition, there may be a single log monitor 216 capable of monitoring multiple log files 222 and/or associated applications.

As shown, each log monitor 216 may be associated with a different application 226. For example, different individual log monitors 216 can be designed to handle Microsoft Exchange data logs, Lotus Notes logs, Microsoft Windows 3000 file system logs, Microsoft Active Directory Objects logs, SQL logs and other types of logs of databases, and other applications. Other embodiments may employ one or more generic log monitors 216 that can handle and process multiple logs from different applications rather than using specialized log monitors 216 described above.

Although illustrated as part of the client computing device 212, the log monitor 216 can in some embodiments execute on a separate device that is associated with the client computing device 212. In certain embodiments, the log monitor 216 is a component of the storage manager 202 and/or collection agent 230. In some embodiments, the log monitor 216 executes on a distinct device in communication with the client computing device 212 (or multiple client computing devices 212), collection agent 230, and/or the storage manager 202, e.g., via a LAN or WAN, Administration of Log Monitoring Rules As discussed previously, the storage manager 202 and client computing device 212 can be in communication so that the client computing device 212 receives log monitoring rules from the storage manager 202. The storage manager 202 or other component may broadcast rules to multiple client computing devices. In some cases, the rules are common across the client computing devices 212 in at least some respects. For instance, each client computing device 212 can receive a set of rules for the software applications 226 running on that client computing device 212. And each client computing device executing a particular application can receive the same or substantially the same rules for that particular application as the other clients running the same application. In other cases, the rules are not application-specific, and the same set of rules can apply across multiple applications. Thus, the system allows for the distribution of sets of rules having at least some commonality across multiple clients from a centralized source such as the storage manager 202. In this fashion, the log monitoring system 300 provides consistent monitoring across the system 300, while reducing administrative overhead associated with defining and distributing the rules for each client independently. In other cases, a common source such as the storage manager 202 distributes unique sets of rules to each client or group of clients.

In some cases, the storage manager 202 or other appropriate component includes a GUI or other user interface through which an administrator or other user can create and/or modify the log monitoring rules. For instance, the log monitoring rules in certain embodiments can be modified using the interface agent 206 of the storage manager 202 (FIG. 2) before transmission to the log monitor 216. In some alternative configurations, the log monitoring rules are created locally to each client computing devices 212.

The log monitoring rules generally define the operation of the log monitor 216. As just a few examples, the log monitoring rules can dictate what applications are to be monitored by the log monitor, what events constitute triggering events, and what action(s) to perform in response to the occurrence of triggering events.

Upon receiving the log monitoring rules, the log monitor 216 begins monitoring the log data for triggering events, as defined by the monitoring rules. The monitoring in some cases is done continuously, in real time, as the application 226 is in use or is otherwise creating the log data. In one such case, the log monitor 216 forms a part of or interacts with a filter driver associated with the application 226 that snoops log activity associated with the corresponding application 226. For instance, the log monitor may snoop log data as it is being written to the primary storage device 220. In other cases, the log monitor 216 reviews and analyzes the log files 222 after they are stored in the primary storage device 220, e.g., periodically or at other intervals.

Triggering Events

As indicated, the log monitor 216 can monitor the log data in order to identify whether certain triggering events or other conditions of interest have occurred, e.g., as defined by the log monitoring rules. And, upon the identifying the occurrence of a triggering event, the log monitor 216 performs or initiates the appropriate response in accordance with the monitoring rules.

The triggering events can include a wide variety of events. One type of triggering event is any unauthorized activity on the monitored client computing device 212. Certain activities are categorized as unauthorized because the activities are performed by a party that is not authorized to perform the particular activity, such as an unauthorized user or program. These activities can include access to a client or particular application running on the client computing device, modification, creation or deletion of files, folders or other system components (or requests or attempts to do the same), a login or attempted login to the client computing device 212 or a particular application running on the client computing device 212, use or attempted use of a particular application or client computing devices 212, etc. In such cases, similar activities performed by an authorized user may not constitute triggering events. As just one example, the log monitor 216 may trigger an event when a member of the marketing department of a company attempts to access a folder containing sensitive employee information, where only members of the human resources department are authorized to access the folder.

The monitoring rules may define other unauthorized activities as being unauthorized due to the nature of the activity itself, and not necessarily based on the authority of the party performing the activity. Such activities are unauthorized regardless of the entity performing the activity. The activities can include many of the activities described above with respect to unauthorized users, such as access to, modification, creation or deletion of files, folders or other system components (or requests or attempts to do the same), a login or attempted login to the client computing device 212 or an application running on the client computing device 212, or use or attempted use of a particular application or client computing devices 212, etc. As just one specific example, modification of certain system configuration files may constitute triggering events in some cases.

In addition to unauthorized activities, triggering events can include activities that are of interest for some other reason. For instance, there may be some reason to track the activities of a particular user or group of users and the monitoring rules may dictate that any activity by a particular user constitutes a triggering event. As another example, access, creation, deletion or modification of particular files or folders of interest (requests or attempts to do the same), while not necessarily unauthorized, may still constitute triggering events. The occurrence of a pre-determined number of particular activities (e.g., file or folder accesses, modifications, creations or deletions, failed login attempts) may also constitute triggering events. Other triggering events can include the termination of an employee or user, a request for access by a terminated employee or other identified user, identification of a computer virus, system error, etc.

Using the log monitoring rules, the log monitor 216 can monitor in real time the applications executed by the client computing device 212 and the logs being generated by the applications executed by the client computing device 212. The log monitor 216 can, in some embodiments, periodically analyze logs stored in the primary storage device 220 of the client computing device 212. For example, the log monitor 216 can review the logs 222 at predefined time increments, such as five minutes, thirty minutes, every few hours, days, weeks, etc. The log monitoring rules can define the scheduling, for example. During each review, new log entries that have not already been analyzed can be reviewed, e.g., for triggering events.

During the monitoring, the log monitor 216 can identify triggering events as defined by the log monitoring rules. Once a triggering event has been identified, the log monitor 216 can perform or initiate an appropriate response based on the log monitoring rules. The response can include, but is not limited to, performing a remedial action associated with the client computing device 212, such as disabling or impairing the use of an application or client, notifying the storage manager, notifying a user, compiling and transmitting a set of data to the collection agent 230 associated with the client computing device 212, requesting data from one or more additional clients related to a user, application, or the triggering event, modifying log monitoring rules of one or more clients, or any other type of action as defined by the log monitoring rules.

Use of Collection Agents

As mentioned, the log monitor 216 can cause the client to filter and transmit data associated with the detected event to the collection agent 230. For instance, the log monitor 216 can, based on the log monitoring rules, collect a filtered subset of the log data 222, primary or production data 224, other data from the client computing device 212, and transmit the filtered subset to the appropriate collection agent(s) 230. The appropriate collection agent(s) 230 may be a collection agent 230 that is dedicated to or otherwise associated with the particular client computing device 212, for instance, as described previously. In this manner, the collection agent 230 and corresponding storage device(s) 232 can act as a repository for a limited, manageable set of data which can be readily analyzed to examine system behavior.

In addition, because the collection agent 230 can be implemented on or as a separate computing device with its own storage device(s) 232, usage of the computing and storage resources of the client computing device 212 in the review of collected data is minimized, improving system performance. In this fashion, the collection agents 230 allow "off-line" auditing of system behavior, reducing the impact on the client computing devices 212.

Further, as discussed previously, the collection agents 230 may be local to (e.g., on the same LAN), dedicated to, or otherwise associated with particular client computing device(s), the collection agents 230. Thus, communications between client computing devices 212 and their respective collection agents 230 can occur over a relatively high performance, low latency network connection (e.g., over a LAN instead of a WAN).

The subset of data can be data associated with the triggering event, and the data that is included in the subset can be determined by the log monitoring rules. The filtered data can include date information, user information, a listing of modified files, deleted files, corrupted files, accessed files, files affected by a virus, event identifiers and any other information that can be used to audit the behavior of the system at or around the time of the triggering event. The filtered data can include log data 222 as well as other data 224 from the data store, such as affected files, folders, entries, etc. In some embodiments only a subset, or portion, of the log data in the data store related to the current triggering event forms the filtered data and is transmitted to the collection agent 230. In certain embodiments, a location identifier, such as a pointer, is transmitted to the collection agent 230 and the log data 222 stays in the primary storage device 220. Furthermore, the log monitor 216 can transmit the filtered data to the collection agent 230 at different times based on the log monitoring rules and/or storage policy. For example, the log monitor 216 can transmit the filtered data to the collection agent 230 at nights or weekends, or at other times when the network has sufficient bandwidth. In some embodiments, the log monitor 216 monitors network traffic to determine when the filtered data should be transferred, such as when the network bandwidth meets a predetermined threshold level. In certain embodiments, the log monitor transfers the filtered data based on a predetermined schedule. In some embodiments, the log monitor 216 communicates with the collection agent 230 over a distinct network path, different from the network path of the storage manager 202 and other log monitoring system components, to avoid network bandwidth issues.

The collection agent 230 can be in communication with any one of the storage manager 202, the client computing device 212, the media agent 234, and/or the secondary storage device 236. The collection agent 230 can communicate with the client computing device 212 and other components of the log monitoring system 200 over any appropriate communication means, such as a LAN, SAN or WAN. In certain embodiments, the collection agent 230 is in physical proximity to the client computing device 212, such as within the same building, room, enterprise, geographic region, etc. In some of these cases, the collection agent 230 communicates with the client computing device 212 via a LAN. In some embodiments, the collection agent 230 is remotely located from the client computing device 212. In some such cases, the collection agent 230 may communicate with the client computing device 212 and/or storage manager 202 via a WAN. In yet other configurations, the collection agent 230 resides on the client computing device 212, and communicates with the various components on the client computing device 212 via an internal bus.

As shown, there can be a plurality of collection agents 230. The allocation of the collection agents 230 can vary depending on the embodiment. For instance, in some cases, each collection agent 230 is associated with a corresponding client computing device 212 or set of client computing devices 212, and is in physical proximity to that client computing device 212 or group of client computing devices 212. In some configurations, a group of more than one collection agent 230 is associated with a particular client computing device 212 or set of client computing devices 212.

The collection agent 230 can include at least one storage device 232 for storing the filtered data received from the client computing device 212. For instance, the collection agent 230 can store the filtered data received from the client per a storage policy or per the log monitoring rules. In some embodiments, the log monitor 216 detects a triggering event and in response gathers select, relevant data related to the event according to the monitoring rules. The client computing device 212 then transmits the select set of filtered data to one or more collection agents 230 for storage. In an example scenario, a first client computing device 212 is associated with a first collection agent 230, and the first client computing device 212 transmits the select set of filtered data to the first collection agent 230 in response to the triggering event. In further embodiments, one or more additional client computing devices 212 may also filter and transmit data to the first collection agent 230 in response to the triggering event on the first client computing device 212. For example, if a virus is detected in the first client computing device 212, the one or more additional clients gather data relevant to the virus detected in the first client computing device 212 (e.g., according to the monitoring rules), and transmit the filtered data to the first collection agent 230. Or the one or more additional client computing devices 212 in other cases may transmit the filtered data to different collection agents 230, such as those that are associated with the respective additional client computing devices 212.

In this way the log monitors 216 can gather, and the collection agents 230 can store, relevant data for triggering events that have occurred over an extended period of time and/or in one or more clients. Furthermore, the collection agent 230 can store all of the triggering events and filtered data of all of the different applications on the client computing device 212, including all the events related to various users of the client, as well as multiple client computing devices 212. In some embodiments, each client computing device 212 uses a designated collection agent 230. In certain embodiments, one collection agent 230 is used with one or more client computing devices 212.

When a user desires to audit system behavior related to a triggering event, such as information related to a specific user, application or client computing device 212, the user can review the data stored in the collection agents 230. The user can search for the data stored in the collection agent 230 based on event identification, user identification, client identification, error identification (e.g., relational database error), or any number of other identifiers that can be used to identify specific events. Because the data stored in the collection agent 230 is a pre-filtered, relevant subset of the log data in the system, the auditing effort is streamlined and user friendly.

In some embodiments, the collection agent 230 can further process the data stored thereon. For example, the collection agent 230 can sort the event data stored thereon based on any number of parameters or identifiers, such as user identification, log event identification, error identification, client identification, frequency of events, etc. In some embodiments, the collection agent 230 formats the various logs into a uniform format. The uniform format can be one of the formats of the log data from a particular application or can be a distinct format as determined by the collection agent 230.

As one example of storing and processing data in the collection agents, if an employee is terminated by a business, the log monitoring system 300 can extract and store in the collection agent(s) 230 log data for events that have occurred in one or more client computing devices 212 that are related to the terminated employee. In this regard, the user is able to quickly identify any aberrations in the terminated employee's use of the applications or clients. As another example, a user can use the collection agent 230 to identify a root cause of error messages from an application 226 (e.g., relational database error messages).

While some of the techniques described above relating to reviewing of the data stored in the collection agents 230 are described above with respect to a user performing the search (e.g., manually), in some cases, the review conducted by some other entity, such as the storage manager 202 or client computing device 212. The review may occur automatically based on the log monitoring rules, for example.

Figure 3B:
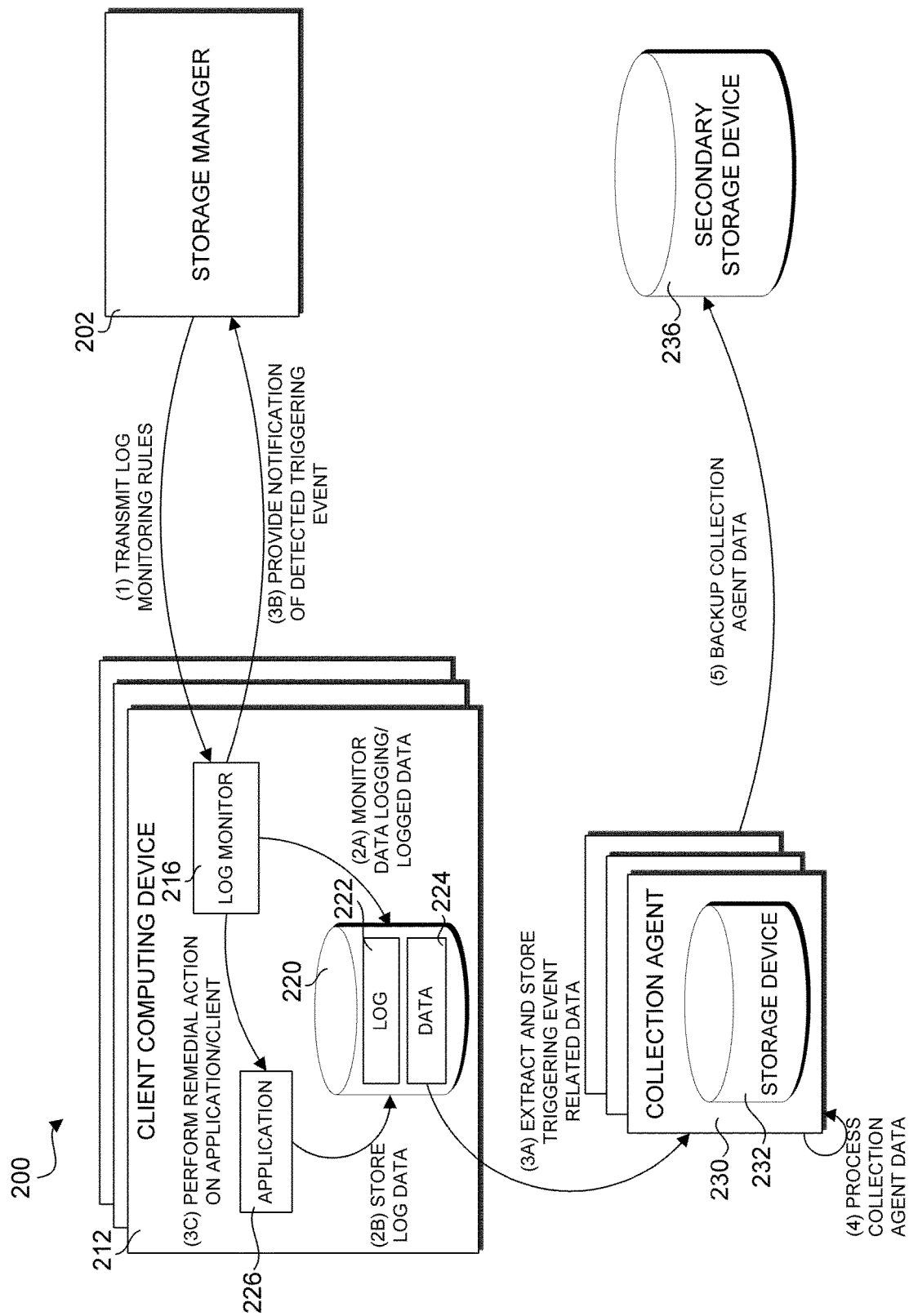
FIG. 3B is a data flow diagram of another embodiment of a log monitoring system illustrating communication between the various components of the system.

The storage device 232 in the collection agent 230 can be treated as a typical data store for purposes of backup by the media agents 234 and secondary storage devices 236. Thus, the log data stored in the collection agent 230 can be backed up or otherwise copied to secondary storage 236 in a fashion similar to the data stored in the primary storage device 220 of the client computing device 212 (e.g., according to a desired storage policy). In this way, relevant data stored in the collection agents 230 is not lost if the primary storage device 220 of the client computing device 212 and/or the storage of the collection agent 232 is corrupted or the data is otherwise lost Example Log Monitoring Data Flow FIG. 3B is a state diagram illustrating the interactions between the different components of the log monitoring system 300. Although not illustrated, in some embodiments, the storage manager 202 can receive log monitoring rules from a user via a user interface. In certain embodiments the storage manager 202 can receive the log monitoring rules from another storage manager 202 in a different cell, a master storage manager, another computing device, and the like.

Upon receiving the log monitoring rules, the storage manager (1) transmits the log monitoring rules to the log monitor 216. Although illustrated as being transmitted to the log monitor 216 of the client computing device 212, the log monitoring rules can be transmitted to any number of various components associated with the client computing device 212. In some embodiments, the log monitoring rules are stored in the primary storage device 220 as data 224. Furthermore, the log monitor 216 can form part of any number of components of the log monitoring system 300. In some alternative embodiments, the log monitor executes on the storage manager 202 or the collection agent 230. In certain embodiments, the log monitor 216 executes on a distinct device that communicates with the various components of the log monitoring system 300 via a LAN, WAN, etc.

Upon receiving the log monitoring rules, the log monitor 216 (2A) monitors the storage of log data, such as log data stored in the primary storage device 220 or log data that is snooped as it is generated by an application 226. As mentioned previously, the monitoring can occur in real time, periodically, or according to some other desired schedule. In addition, as the application 226 executes, (2B) log data is stored in the primary storage device 220 as log files 222. As mentioned previously, the log files 222 include information related to the use of the applications, such as access of files, authorization with regards to the access of those files, application errors (e.g., relational database errors), etc. The log files 222 can include information from various applications and from various users of the client computing device 212.

During the monitoring process, the log monitor 216 identifies events as they occur. Upon identifying particular triggering events, the log monitor 216 performs an appropriate response based on the log monitoring rules. The response can include, but is not limited to, (3A) compiling and storing event related data in the collection agent 230, (3B) providing notification of the event to the storage manager 202, and/or (3C) performing a remedial action associated with the client computing device, such as terminating, impairing, or otherwise limiting the use of the application 226 or client computing device 212 (e.g., for a particular user).

In storing the event related data in the collection agent 230, the log monitor 216 can specify what data and what parts of the log files 222 and/or other client data should be stored in the collection agent 230. In this regard, only the desired log data and other relevant data can be stored in the collection agent 230, and the amount of data stored in the collection agent 230 can be significantly reduced. Thus, the collection agent 230 can include only that information that is deemed relevant to the triggering event, or to any associated review of system behavior in response to the triggering event.

In providing the notification to the storage manager, the log monitor 216 can provide sufficient information to the storage manager in 202 in order to identify the affected application, the user, and the client computing device 212 associated with the triggering event. Upon receiving the notification of the triggering event, the storage manager 202 can perform some appropriate action on its own. For example, the storage manager 202 can notify an administrator of the computer network, block the user from access to the client computing device 212, disable the affected application 226 or otherwise prevent or limit access to the application 226 (e.g., by the offending user), or perform some other operation as desired, and as specified by the log monitoring rules. For example, the storage manager 202 can review the logs 222 of other client computing devices 212 that may be effected by the triggering event or otherwise relevant to the review of the system behavior in response to the triggering event.

In some cases, the storage manager 202 initiates or performs a review of data stored on one or more other collection agents 230, such as those associated with different client computing devices 212. The storage manager 202 can also, in response to identifying a triggering event on one client computing device 212, cause other client computing devices 212 to transmit relevant data to their respective collection agents 230. For example, if the event is the detection of a virus, the storage manager 202 can communicate with the log monitors 216 of other client computing devices 212 to determine whether other client computing devices 212 have been affected. Similarly, if the event is a particular user attempting to access a particular client computing device 212, or gaining unauthorized access to the particular client computing device 212, the storage manager can communicate with the log monitors 216 of other client computing devices 212 to determine if the particular user has attempted to log on to the other client computing devices 212 or gained access to the other client computing devices 212. In addition, the storage manager can communicate with the log monitors 216 of the other client computing devices 212 to transmit data relevant to the particular user to the collection agent 230 for further analysis. In this manner, the system 300 provides system wide monitoring based on locally detected behavior.

The log monitor 216 can perform similar actions to that of the storage manager 202 in response to the review of log data. For example, the log monitor 216 can disable the client computing device 212, the application 226, or evict or otherwise limit the user from use of the client computing device 212 and/or the application 226. In addition, the log monitor 216 can communicate with other log monitors 216 to determine if other client computing devices 212 have been affected by an event or request that logs 222 or data 224 in the other client computing devices 212 be transmitted to the collection agent 230. Furthermore, the log monitor 216 can notify an administrator of the event as desired. The log monitor 216 can perform any of the described actions in sequence or in parallel as desired and as determined by the log monitoring rules.

Upon receiving the transmitted subset of data from the client computing device 212, the collection agent 230 can (4) perform additional processing of the data. For example, the collection agent 230 can group or sort data based on a client ID, an application ID, a user ID, or any number of other identifiers or other parameters. For example, when one or more client computing devices 212 provide information regarding a particular user attempting to access the clients, the corresponding collection agents 230 can notify another user, an administrator, the log monitor 216, the storage manager 202 or other appropriate entity of the attempted access. Furthermore, the collection agent 230 can identify trends in the collected data to aid in diagnosing problems, such as those associated with monitored applications 226. In addition, the collection agent 230 can format the log data into a uniform format, as desired, to ease processing.

Based on a storage policy, the data in the storage device 232 of the collection agent 230 can be treated similar to the data 224 in the primary storage device 220 of the client computing device 212 for backup purposes. Thus, as determined by the storage policy, the data in the storage device 232 can (5) be backed-up, archived, or otherwise copied to the secondary storage device 236.

Example Log Monitoring Process

Figure 4:
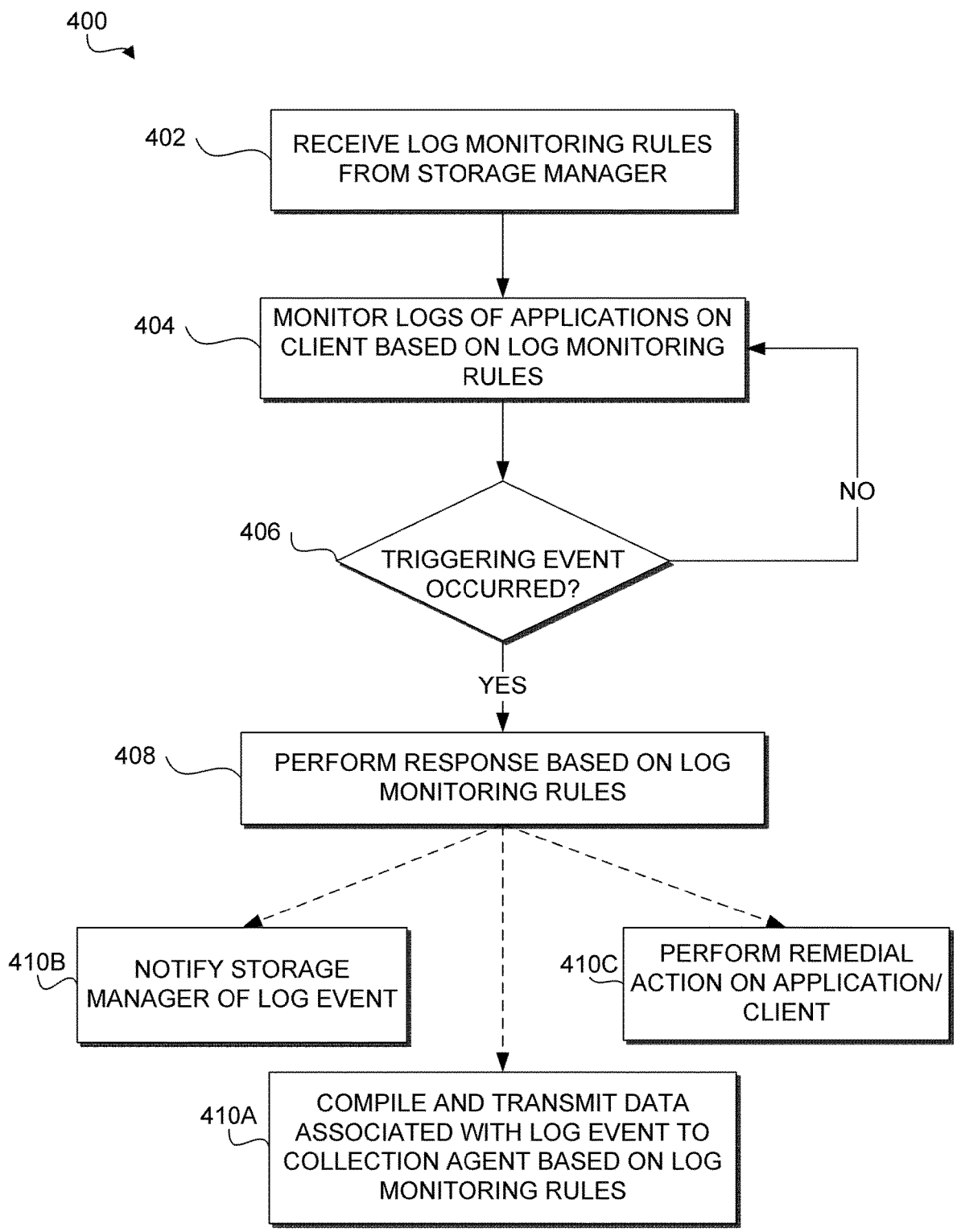
FIG. 4 is a flow diagram illustrating an example routine for transmitting data associated with a triggering event to a collection agent.

FIG. 4 is a flow diagram illustrative of an embodiment of a routine 400 implemented by the log monitor 216 for performing a remedial action or other response to an identified event. One skilled in the relevant art will appreciate that the elements outlined for routine 400 can be implemented by one or more computing devices/components that are associated log monitoring system 200 of FIG. 2 or the log monitoring system 300 of FIG. 3, such as the client computing device 212, the storage manager 202, the collection agent 230, and/or the media agent 234. Accordingly, the routine 400 can be performed by the log monitors 216 of any of the systems depicted in FIG. 2, 3A or 3B, or by some other log monitor. The following illustrative embodiments should not be construed as limiting.

At block 402, the log monitor 216 receives log monitoring rules from the storage manager 202. The log monitoring rules can be received via a wired or wireless network, a LAN, a WAN, etc. The log monitoring rules can specify which applications are to be monitored by the log monitor 216, as well as what log information should be analyzed. The log monitoring rules can further include processes and parameters used by the log monitor 216 to determine when a triggering event has occurred. Furthermore, the log monitoring rules can dictate responses to detected events that are to be taken by the log monitor 216.

At block 404, the log monitor 216 monitors logs generated by applications on the client computing device 212 based on the log monitoring rules. The log monitor 216 can monitor the logs of applications in real time or periodically. Furthermore, the log monitor 216 can monitor the logs by reviewing log data as it is transmitted to the primary storage device 220, or by reviewing log data already stored in the primary storage device 220.

At decision block 406, the log monitor 216 determines whether a triggering event has occurred. The log monitor 216 can determine whether an event has occurred based on the log monitoring rules. For example, if the log monitoring rules state that User1 does not have access to DB1 or Application1, and the logs indicate User1 has accessed DB1 or Application1, the log monitor 216 can determine that a triggering event has occurred. Similarly, if the log monitoring rules state that particular errors (e.g., relational data base errors) are considered triggering events, the log monitor can identify log entries corresponding to the particular errors as triggering events.

As mentioned previously, the log monitor 216 can monitor the logs in real time or periodically. Thus, the triggering event can be identified as an application is in use or as the log is being generated, or when the log monitor 216 reviews log files 222 stored in the primary storage device 220. If no triggering event is identified, the log monitor 216 continues to monitor the logs of the applications on the client as discussed previously with regards to block 404.

However, if the log monitor 216 determines that a triggering event has occurred, the log monitor 216 performs an appropriate response based on the log monitoring rules, as illustrated in block 408. As mentioned previously the response can include any number of different actions, such as compiling and transmitting data associated with the detected triggering event to the collection agent 230 based on the log monitoring rules (block 410A), notifying the storage manager of the event (block 410B), performing a remedial action on the application and/or client (block 410C), etc. Additional responses can include, but are not limited to, notifying a user or administrator via email, fax, SMS, telephone, etc, copying (e.g., backing up) all original data that is modified by the user, storing data modified by the user in a different location than the original data, logging all keystrokes of the user, powering down the client, impairing the use of the application and/or client, disabling the application and/or client, blocking or otherwise limiting user access to the application and/or client, modifying the log monitoring rules of other clients, requesting other clients to transmit relevant data, such as data related to a particular user, application, etc., to the collection agent, and the like. In some embodiments, the log monitor 216 performs multiple actions in response to the detected event, e.g., sequentially or in parallel.

With respect to block 410A, the data transmitted to the collection agent 230 can be any number of types of data or amounts of data. For example, the data transmitted can be the data relevant to the current instance of the triggering event, or can be data related to similar client events. In addition, the data transmitted can include additional data 224 related to the client computing device 212 or the user, or the application 226 as desired, and as discussed previously. Furthermore, the data can be transmitted at a predefined schedule, or can be transmitted when the network bandwidth meets a predefined threshold level.

Additional, fewer, or different blocks can be used to implement the process 300 without departing from the spirit and scope of the description. For example, the various client event responses can be performed in parallel or sequentially.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method for monitoring log data associated with a plurality of client computing devices, the method comprising:
    parsing, with a first monitoring module comprising one or more computer processors, at least a first log on a first client computing device, the first log comprising log data generated by a plurality of applications executing on the first client computing device;
    in response to said parsing the log data stored in the first log, and based on log monitoring rules, detecting a triggering event that a computer virus has infected the first client computing device;
    in response to identifying the triggering event in the first log and based on the log monitoring rules, extracting with the first monitoring module, a first subset of log data from at least the first log for storage in a first collection repository that is separate from the first client computing device and stores the first subset of log data;
    in response to identifying the triggering event, extracting with a second monitoring module comprising one or more computer processors, a second subset of log data from at least a second log associated with a second client computing device for storage in a second collection repository and detecting whether the second client computing device has been infected with the computer virus;
    performing a backup operation with one or more computer processors that copies the first and second subsets of log data stored in the first and second collection repositories to secondary storage;
    determining whether at least one additional client computing device is affected by the triggering event; and
    in response to determining that the at least one additional client computing device is affected by the triggering event, performing a remedial action associated with the at least one additional client computing device.

2. The method of claim 1, wherein the first and second subsets of log data comprises data generated by the first and second client computing devices prior to the triggering event.

3. The method of claim 1, wherein the first and second subsets of log data comprises files affected by the computer virus.

4. The method of claim 1, further comprising, in response to identifying the triggering event, and based on the log monitoring rules, performing a remedial action associated with the first client computing device.

5. The method of claim 4, wherein the remedial action comprises at least one of the group consisting of: notifying a storage manager module of the triggering event, limiting or preventing access to at least one application of the plurality of applications, limiting or preventing access to the first client computing device, limiting or preventing access to at least one file or folder stored on the first client computing device, and notifying a user or administrator of the triggering event.

6. The method of claim 4, wherein the remedial action is initiated and performed by the first client computing device without input from a storage manager module.

7. The method of claim 1, wherein the triggering event further includes at least one of the group consisting of: an unauthorized access, an attempted unauthorized access, a request for unauthorized access, a predetermined number of failed login attempts, an unauthorized modification of one or more files, an application error, and termination of employment of a user.

8. The method of claim 1, further comprising processing of data stored in the first collection repository to audit system behavior, wherein the processing of the data is performed by a computing device other than the first client computing device.

9. The method of claim 1, wherein the first client computing device and the first collection repository communicate via a local area network (LAN), and the first client computing device and a storage manager module communicate via a wide area network (WAN).

10. A system configured to monitor log data in a data storage environment, the system comprising:
   at least first and second client computing devices having a plurality of applications executing thereon;
   at least a first set of log monitoring rules that define one or more triggering events;
   at least a first log associated with the first computing device and a second log associated with the second client computing device;
   at least a first monitoring module and a second monitoring module, the first and second monitoring modules comprising one or more computer processors;
   the first monitoring module configured to parse at least the first log on a first client computing device, the first log comprising log data generated by a plurality of applications executing on the first client computing device;
   in response to parsing the log data stored in the first log, and based on log monitoring rules, the first monitoring module is configured to detect a triggering event that a computer virus has infected the first client computing device;
   in response to identifying the triggering event in the first log and based on the log monitoring rules, the first monitoring module is configured to extract a first subset of log data from at least the first log for storage in a first collection repository that is separate from the first client computing device and stores the first subset of log data;
   in response to identifying the triggering event, the second monitoring module is configured to extract a second subset of log data from at least the second log associated with the second client computing device for storage in a second collection repository and detect whether the second client computing device has been infected with the computer virus;
   a storage manager module comprising one or more computer processors, the storage manager module configured to direct performance of a backup operation that copies the first and second subsets of log data stored in the first and second collection repositories to secondary storage;
   one or more computer processors configured to determine whether at least one additional client computing device is affected by the triggering event; and
   in response to determining that the at least one additional client computing device is affected by the triggering event, the one or more computer processors are configured to perform a remedial action associated with the at least one additional client computing device.

11. The system of claim 10, wherein the first and second subsets of log data comprises data generated by the first and second client computing devices prior to the triggering event.

12. The system of claim 10, wherein the first and second subsets of log data comprises files affected by the computer virus.

13. The system of claim 10, wherein the first monitoring module, in response to identifying the triggering event, and based on the log monitoring rules, is configured to perform a remedial action associated with the first client computing device.

14. The system of claim 13, wherein the remedial action comprises at least one of the group consisting of: notifying a storage manager module of the triggering event, limiting or preventing access to at least one application of the plurality of applications, limiting or preventing access to the first client computing device, limiting or preventing access to at least one file or folder stored on the first client computing device, and notifying a user or administrator of the triggering event.

15. The system of claim 13, wherein the remedial action is initiated and performed by the first client computing device without input from the storage manager module.

16. The system of claim 10, wherein the triggering event further includes at least one of the group consisting of: an unauthorized access, an attempted unauthorized access, a request for unauthorized access, a predetermined number of failed login attempts, an unauthorized modification of one or more files, an application error, and termination of employment of a user.

17. The system of claim 10, further comprising a computing device other than the first client computing device that is configured to process data stored in the first collection repository to audit system behavior.

18. The system of claim 10, wherein the first client computing device and the first collection repository communicate via a local area network (LAN), and the first client computing device and the storage manager module communicate via a wide area network (WAN).

* * * * *